3,298,996
STABILIZED POLYOLEFINS CONTAINING CARBOXY-SUBSTITUTED DIPHENYL DISULFIDES
William M. Nelson, Bartlesville, Okla., assignor to Phillips Petroleum Company, a corporation of Delaware
No Drawing. Filed June 22, 1964, Ser. No. 377,086
8 Claims. (Cl. 260—45.85)

This invention relates to stabilized normally solid olefin polymers.

In recent years, many new normally solid plastic materials which have broad utility have been prepared by the polymerization of olefins. These polymers are extensively used in the fabrication of films, fibers, and a variety of molded and extruded items. These polymers are fabricated into usable form, most generally, by blowing, molding, or extrusion techniques. However, in some instances, particularly in the application of polypropylene in environments where elevated temperatures are encountered, degradation of the polymer is extensive which results in poor clarity and surface texture. These adverse effects are most notable when the polymer is fabricated into films. Numerous additives have been proposed for the stabilization of these polymers but few, if any, are entirely satisfactory.

In the fabrication of films from normally solid olefin polymers, generally, a blowing technique or chill-roll casting technique is employed. In the blowing technique wherein a tube of polymer melt is formed and air is introduced within the tube to expand it, the resulting film most generally has a rough surface or poor clarity. In the chill-roll casting technique wherein a shaped polymer melt is cast onto the surface of a cold-roll, the resulting film most generally has streaks and bubbles therein.

Accordingly, an object of this invention is to provide improved stabilization of normally solid olefin polymers.

Another object of this invention is to provide an improved method for stabilizing olefin polymers against thermal degradation.

Still another object of this invention is to provide a new composition of olefin polymers capable of being fabricated without being adversely degraded.

Still another object of this invention is to provide compounds which improve the stability of olefin polymers.

Other objects, aspects and advantages of this invention will become apparent to those skilled in the art upon further study of this disclosure and the appended claims.

I have now discovered that olefin polymer in general, and particularly polypropylene, can be effectively stabilized against degradation during fabrication by incorporation therein of certain carboxy-substituted diphenyl disulfides, particularly bis(carboxyphenyl)disulfides, bis(dicarboxyphenyl)disulfides, and tricarboxydiphenyl disulfides. The disulfides applicable to this invention have the general formula:

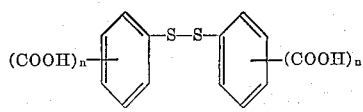

wherein the carboxy groups are attached at any of the five available positions on the aromatic ring, and $n$ is an integer selected from the group consisting of 1 and 2. Examples of the disulfides are bis(2-carboxyphenyl)disulfide, bis(3-carboxyphenyl)disulfide, bis(4-carboxyphenyl)disulfide, 2,3'-dicarboxydiphenyl disulfide, 2,4'-dicarboxydiphenyl disulfide, 3,4'-dicarboxydiphenyl disulfide, 2,2',3-tricarboxydiphenyl disulfide, 2,3,3'-tricarboxydiphenyl disulfide, 2,3,4'-tricarboxydiphenyl disulfide, 2,2',4-tricarboxydiphenyl disulfide, 2,3',4-tricarboxydiphenyl disulfide, 2,4,4'-tricarboxydiphenyl disulfide, 2',3,4-tricarboxydiphenyl disulfide, 3,3',4-tricarboxydiphenyl disulfide, 3,4,4'-dicarboxydiphenyl disulfide, bis(2,4-dicarboxyphenyl)disulfide, bis(2,3-dicarboxyphenyl)disulfide, bis(3,4-dicarboxyphenyl)disulfide, 2,2',3,4'-tetracarboxydiphenyl disulfide, 2,3,3',4'-tetracarboxydiphenyl disulfide, 2,3',4,4'-tetracarboxydiphenyl disulfide, and the like.

The stabilizing compounds of this invention can be incorporated into the polymer by any suitable means. One method of incorporating the stabilizing compound involves dissolving the stabilizing compound in a volatile solvent such as acetone, ethyl ether, ethyl alcohol, and the like, and spraying the particulate polymer with a solution. The spraying of the particulate polymer can be done, for example, during conveying of the polymer in a screw conveyor or while tumbling the polymer particles in a drum. The solvent is subsequently removed by a current of air and/or heating, and the treated polymer is stored for subsequent use. Another method for incorporating a stabilizing compound is by dry-blending or by milling or kneading processes which use, for example, a Banbury mixer or a roll mill. Generally, the mixing temperatures are at least as high as the melting point of the polymers.

The stabilizing compounds of this invention can be incorporated into the polymer in any desired amount. Generally, the amount of stabilizer compound used is in the range of about 0.01 to about 5.0, preferably 0.05 to 0.5, percent by weight based on the polymer.

The stabilizing compounds of this invention can be effectively employed in olefin polymers which are subject to degradation. Such polymers include those polymerized from olefins having 2 to 8 carbon atoms per molecule and copolymers formed from combinations of such olefins. The polymer to be stabilized can contain other additives including stress cracking inhibitors, other oxidation inhibitors, vulcanization accelerators, fillers, pigments, and the like. Generally, the polymers employed in this invention will be those in which thermal degradation is a problem, such as polypropylene, poly-1-butene, poly-2-methylpentene, polyisobutylene, copolymers of 2-8 carbon atoms per molecule olefins, and the like.

Although the process of preparing the polymers to be treated in accordance with this invention has no particular requirements, polymers prepared in the presence of organo metal catalysts which have subsequently been treated with acetylacetone to remove catalyst components and residues are prone to become streaked and full of bubbles during fabrication. The stabilizers of this invention are highly effective in reducing and even completely eliminating such streaking and bubble formation.

The following examples will illustrate the present invention in better detail, but they are not to be construed as limiting the invention.

*Example I*

Polyethylene, prepared in accordance with Hogan et al. Patent 2,829,721 (1958), and having a density of approximately 0.960 gram/cc. as determined by ASTM D1505-57T, is dry blended with bis(3-carboxyphenyl)disulfide so that the blend contains 0.075 weight percent of the disulfide. The blend is then formed by heating and extruding at a temperature of about 350° F. into a tubular form to which air is introduced. The air expands the tube into a film having a thickness of about 4 mils. The film thus produced is noticeably clearer with less haze than film produced in a like manner from the same polyethylene but without the disulfide.

*Example II*

A commercial film-grade polypropylene manufactured by Eastman Chemical Products, Inc., is dry blended with sufficient bis(2-carboxyphenyl)disulfide to obtain a blend containing 0.075 weight percent of the disulfide. Film having 4 mil thickness is blown from the blend in accordance with Example I. The clarity of the film is determined by a See-Through test which comprises reading the 20/20 line of an eye chart with a film one foot from the eye or one foot from the chart, and a value of 20 means that the film is transparent and a value of 0 means that the film is opaque. With film one foot from the eye, the chart can be read at a distance of about 6 feet using the treated polymer film of this example, whereas the chart can be read at a distance of only about one inch when using film formed from the same polymer but not containing the disulfide. With the film one foot from the chart, the readability through film of the untreated polymer is nil, whereas, the chart can be read from a distance of about eight feet using the treated polymer film. The haze of the two films in comparison is approximately 74 percent for the untreated polymer film and 60 percent for the treated polymer film as measured by ASTM D1003-61.

*Example III*

Exceptionally clear film formed from a copolymer of ethylene-butene-1 prepared in accordance with the Hogan et al. patent, supra, is obtained by blending therewith sufficient 2,2′3,4′-tetracarboxydiphenyl disulfide so that approximately 0.3 weight percent of the blend is the disulfide. The film is formed by the blow molding techniques described in Example I. The film formed from similar ethylene-butene-1 copolymer without additive is noticeably cloudy and does not have the see-through characteristics of the film treated in this example.

*Example IV*

Polypropylene is prepared in a continuous operation using a catalyst comprising (1) the reaction product of aluminum and titanium tetrachloride and (2) diethylaluminum chloride. Liquid propylene containing between 0.14 and 0.19 mole percent of hydrogen is charged to a 50-gallon reactor at a rate of about 10 gallons per hour. Components (1) and (2) of the catalyst are charged to the reactor at a rate of about 0.01 and 0.014 pound/hour, respectively. The polymerization reaction is carried out at a temperature of about 115° F. and under sufficient pressure to maintain the reactants in liquid phase. The residence time in the reactor is about 5 hours.

The effluent from the reactor is passed to a contacting vessel to which about 0.074 pound/hour of acetylacetone is introduced for complexing the metal components of the catalyst charged to the reactor. The contacting is conducted at a temperature of about 140–145° F. and under sufficient pressure to maintain the unreacted propylene in liquid phase. After about 45 minutes in the contact vessel, the polypropylene is removed and washed with liquid propylene.

A sample of the polypropylene, thus prepared, is dry blended with bis(2-carboxyphenyl)disulfide so that approximately 0.075 weight percent of the blend is the disulfide. The blend is then pelletized at 450° F. and extruded into chill-rolled film at an extrusion temperature of 550° F. In a test for bubbles and streaks wherein 0 represents the absence of bubbles and 10 represents maximum bubbles, the treated film of this example is free of bubbles and streaks (i.e., a rating of 0), while film prepared from the same polypropylene but without the disulfide has a rating of 2 or 3.

*Example V*

Polypropylene prepared in accordance with that of Example IV is sprayed with a solution of bis(3,4-dicarboxyphenyl)disulfide dissolved in acetone. The thus treated polypropylene is then dried by heating for removal of the solvent and then extruded at a temperature of about 550° F. onto a chilled roll to produce chill-rolled film having a thickness of approximately 4 mils. The bubble rating of the film is approximately 0 and film prepared in a like manner without the addition of the disulfide has a rating of about 4 in the bubble and streak test.

It can be seen from the above examples that the stabilizing compounds of this invention have a marked effect upon the polymer in improving the clarity and reducing streaking of the films produced therefrom.

Reasonable variations and modifications of this invention will be apparent in view of the foregoing disclosure and appended claims which will not depart from the scope thereof.

I claim:
1. A solid polymer of a 2 to 8 carbon atoms per molecule monoolefin and 0.01 to 5.0 weight percent of a carboxy-substituted diphenyl disulfide having the formula:

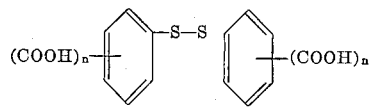

wherein the carboxy groups are attached at any of the available five positions and $n$ is an integer selected from the group consisting of 1 and 2.

2. A solid polymer of a 2 to 8 carbon atoms per molecule monoolefin and 0.01 to 5.0 weight percent of bis(2-carboxyphenyl)disulfide.

3. Polypropylene and 0.01 to 5.0 weight percent of bis(2-carboxyphenyl)disulfide.

4. Polypropylene containing acetylacetone-polymerization catalyst complex and 0.01 to 5.0 weight percent of a carboxy-substituted diphenyl disulfide having the formula:

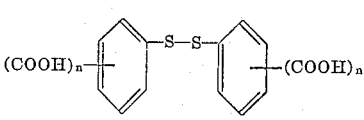

wherein the carboxy groups are attached at any of the available five positions and $n$ is an integer selected from the group consisting of 1 and 2.

5. The composition of claim 4 wherein the disulfide is bis(2-carboxyphenyl)disulfide.

6. The composition of claim 4 wherein the disulfide is 2,2′,3,4′-tetracarboxyldiphenyl disulfide.

7. The composition of claim 4 wherein the disulfide is bis(3,4-dicarbonylphenyl)disulfide.

8. A solid polymer of at least 2 monoolefins having 2 to 8 carbon atoms per molecule and 0.01 to 5.0 weight percent of a disulfide having the formula:

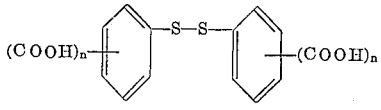

wherein the carboxy groups are attached at any of the available five positions and $n$ is an integer selected from the group consisting of 1 and 2.

References Cited by the Examiner
UNITED STATES PATENTS

| | | | |
|---|---|---|---|
| 1,769,423 | 7/1930 | Eder | 260—516 |
| 3,057,926 | 10/1962 | Coffield | 260—45.95 |
| 3,227,677 | 1/1966 | Simpson | 260—45.85 |

LEON J. BERCOVITZ, *Primary Examiner.*

G. W. RAUCHFUSS, *Assistant Examiner.*

UNITED STATES PATENT OFFICE
CERTIFICATE OF CORRECTION

Patent No. 3,298,996                          January 17, 1967

William M. Nelson

It is hereby certified that error appears in the above numbered patent requiring correction and that the said Letters Patent should read as corrected below.

Column 4, line 20, the formula should appear as shown below instead of as in the patent:

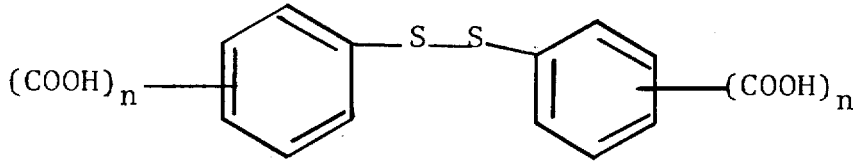

column 4, line 48, for "tetracarboxyldiphenyl" read -- tetracarboxydiphenyl --.

Signed and sealed this 24th day of October 1967.

(SEAL)
Attest:

EDWARD M. FLETCHER, JR.                    EDWARD J. BRENNER
Attesting Officer                          Commissioner of Patents